(12) United States Patent
Kim et al.

(10) Patent No.: US 8,551,583 B2
(45) Date of Patent: Oct. 8, 2013

(54) LIQUID CRYSTAL DISPLAY AND METHOD OF MANUFACTURING THE SAME

(75) Inventors: Jin Seuk Kim, Daejeon (KR); Chul Huh, Yongin-si (KR); Yui-Ku Lee, Asan-si (KR); Sun-Young Chang, Gwangmyeong-si (KR)

(73) Assignee: Samsung Display Co., Ltd., Yongin (KR)

( * ) Notice: Subject to any disclaimer, the term of this patent is extended or adjusted under 35 U.S.C. 154(b) by 233 days.

(21) Appl. No.: 13/185,258

(22) Filed: Jul. 18, 2011

(65) Prior Publication Data
US 2012/0257148 A1    Oct. 11, 2012

(30) Foreign Application Priority Data

Apr. 5, 2011 (KR) .................. 10-2011-0031211

(51) Int. Cl.
*G02F 1/23* (2006.01)
(52) U.S. Cl.
USPC .......... 428/1.31; 349/106; 349/187; 430/46.3
(58) Field of Classification Search
USPC ........ 428/1.3–1.31; 349/106, 187; 106/31.48; 430/46.3; 8/466, 568, 662; 534/771
See application file for complete search history.

(56) References Cited

U.S. PATENT DOCUMENTS

| | | | |
|---|---|---|---|
| 5,942,292 A | 8/1999 | Yoneda et al. | |
| 6,512,643 B1 | 1/2003 | Wada | |
| 7,005,507 B2 | 2/2006 | Pichler et al. | |
| 7,123,319 B2 | 10/2006 | Broer et al. | |
| 7,332,257 B2 | 2/2008 | Miyako et al. | |
| 2003/0032713 A1 | 2/2003 | Penterman et al. | |
| 2003/0136301 A1* | 7/2003 | Shawcross et al. | 106/31.48 |
| 2008/0010756 A1 | 1/2008 | Hall-Goulle et al. | |
| 2010/0075098 A1 | 3/2010 | Luecke et al. | |

FOREIGN PATENT DOCUMENTS

| | | | | |
|---|---|---|---|---|
| GB | 1 460 366 A | * | 3/1974 | ............ C09B 29/36 |
| JP | 2007-031616 | | 2/2007 | |
| JP | 2010-044276 | | 2/2010 | |
| KR | 10-0490779 | | 5/2005 | |

* cited by examiner

*Primary Examiner* — Sophie Hon
(74) *Attorney, Agent, or Firm* — H.C. Park & Associates, PLC

(57) ABSTRACT

A liquid crystal display includes a color filter including a dye and a pigment, and the color filter is formed from a compound represented by the following Formula 1.

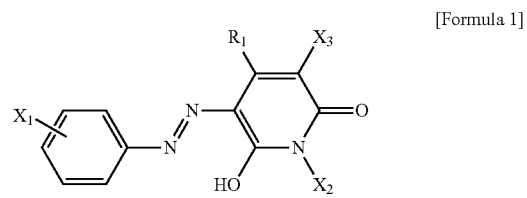

[Formula 1]

wherein R1 is hydrogen or a substituted or unsubstituted $C_1$-$C_5$ alkyl group, $X_1$, $X_2$, and $X_3$ are independently a $NR_2R_3$ group, $OR_4$, a $R_5C$=$CR_6R_7$ group, or a $OC(=O)R_8C$=$CR_9R_{10}$ group, and $R_2$ to $R_{10}$ are independently hydrogen or a substituted or unsubstituted $C_1$-$C_5$ alkyl group.

18 Claims, 4 Drawing Sheets

LIQUID CRYSTAL DISPLAY AND METHOD OF MANUFACTURING THE SAME

CROSS REFERENCE TO RELATED APPLICATION

This application claims priority to and the benefit of Korean Patent Application No. 10-2011-0031211 filed in the Korean Intellectual Property Office on Apr. 5, 2011, the entire contents of which are incorporated herein by reference.

BACKGROUND OF THE INVENTION

1. Field of the Invention

Exemplary embodiments of the present invention relate to a color filter, a liquid crystal display and a method for manufacturing the same.

2. Discussion of the Background

A liquid crystal display is one type of a flat panel display that is widely used at present. A liquid crystal display includes two display panels on which field generating electrodes such as a pixel electrode and a common electrode are formed, and a liquid crystal layer that is interposed therebetween. The liquid crystal display displays an image by applying a voltage to the field generating electrodes to generate an electric field in the liquid crystal layer, thereby determining the direction of liquid crystal molecules of the liquid crystal layer, and controlling the polarization of incident light.

A color filter, a spacer, and the like may be disposed in a display panel of the liquid crystal display. The color filter may display various colors, and is formed on the display panel for each color. Since the color filter affects transmittance of the liquid crystal display, a study for improving the transmittance of the color filter and maintaining reliability of the color filter has been researched.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Additional features of the invention will be set forth in the description which follows, and in part will be apparent from the description, or may be learned by practice of the invention.

Exemplary embodiments of the present invention provide a liquid crystal display including: a first substrate; a second substrate facing the first substrate; a liquid crystal layer disposed between the first substrate and the second substrate; a pair of electrodes disposed on at least one of the first substrate and the second substrate. A color is filter is disposed between the first substrate and the second substrate and includes a dye and a pigment, wherein the color filter is formed from a compound represented by the following Formula 1.

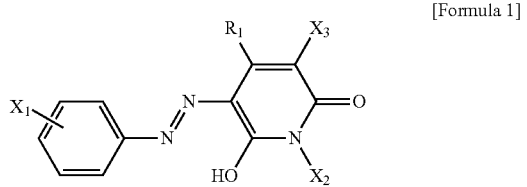

[Formula 1]

wherein R1 is hydrogen or a substituted or unsubstituted $C_1$-$C_5$ alkyl group, $X_1$, $X_2$, and $X_3$ are independently a $NR_2R_3$ group, $OR_4$, a $R_5C\!=\!CR_6R_7$ group, or a $OC(\!=\!O)R_8C\!=\!CR_9R_{10}$ group, and $R_2$ to $R_{10}$ are independently hydrogen or a substituted or unsubstituted $C_1$-$C_5$ alkyl group.

Exemplary embodiments of the present invention also provide a method for manufacturing a liquid crystal display, the method including: forming a pair of electrodes on at least one of the first substrate and the second substrate; forming a color filter including a dye and a pigment on the first substrate or the second substrate; and forming a liquid crystal layer between the first substrate and the second substrate, wherein the color filter is formed from a compound represented by the following Formula 1.

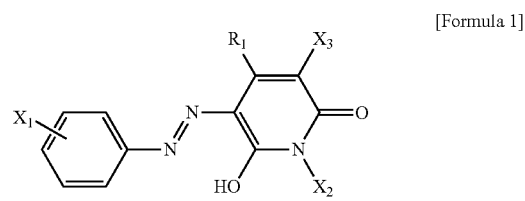

[Formula 1]

wherein R1 is hydrogen or a substituted or unsubstituted $C_1$-$C_5$ alkyl group, $X_1$, $X_2$, and $X_3$ are independently a $NR_2R_3$ group, $OR_4$, a $R_5C\!=\!CR_6R_7$ group, or a $OC(\!=\!O)R_8C\!=\!CR_9R_{10}$ group, and $R_2$ to $R_{10}$ are independently hydrogen or a substituted or unsubstituted $C_1$-$C_5$ alkyl group.

Exemplary embodiments of the present invention also provide a color filter including a dye and a pigment. The dye includes a compound represented by the following Formula 1:

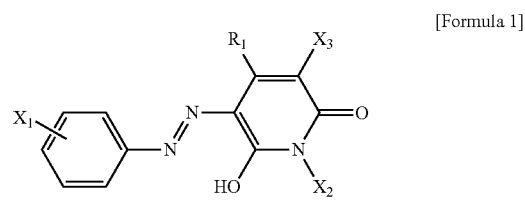

[Formula 1]

wherein $R_1$ is hydrogen or a substituted or unsubstituted $C_1$-$C_5$ alkyl group, $X_1$, $X_2$, and $X_3$ are independently a $NR_2R_3$ group, $OR_4$, a $R_5C\!=\!CR_6R_7$ group, or a $OC(\!=\!O)R_8C\!=\!CR_9R_{10}$ group, and $R_2$ to $R_{10}$ are independently hydrogen or a substituted or unsubstituted $C_1$-$C_5$ alkyl group.

It is to be understood that both the foregoing general description and the to following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
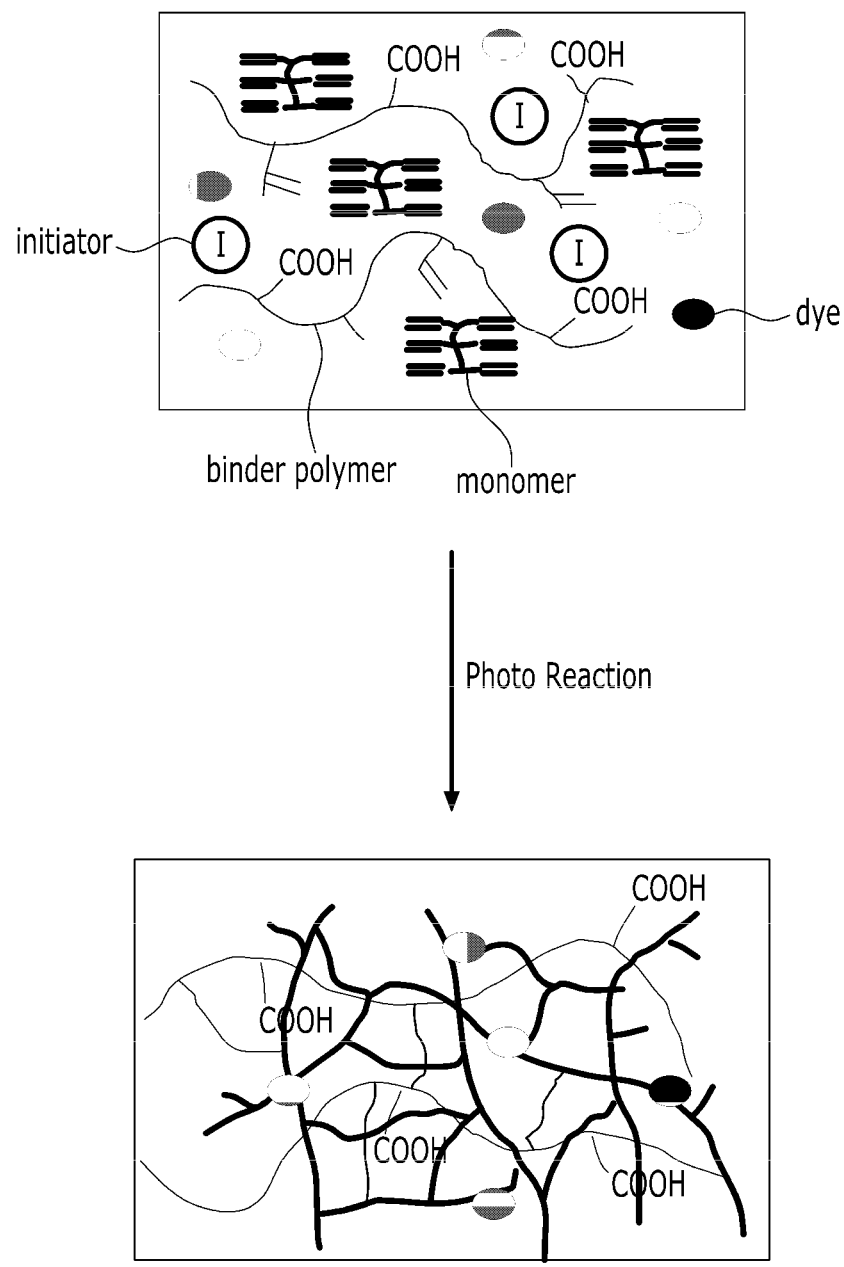
FIG. 1 is a view schematically illustrating a reaction of a dye according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. Furthermore, a detailed description of a widely known technology will be omitted.

In the drawings, the thickness of layers, films, panels, regions, etc., are exaggerated for clarity. It will be understood that when an element such as a layer, film, region, or substrate is referred to as being "on" or "connected to" another element, it can be directly on or directly connected to the other element or intervening elements may also be present. In contrast, when an element is referred to as being "directly on" or "directly connected to" another element, there are no intervening elements present. It will be understood that when an element such as a layer, film, region, or substrate is referred to as being "beneath" another element, it can be directly beneath the other element or intervening elements may also be present. In contrast, when an element is referred to as being "directly beneath" another element, there are no intervening elements present. It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ).

In the present specification, unless otherwise specifically stated, the term "substituted" means that a matter is substituted by halogen, a $C_1$-$C_{20}$ haloalkyl group, a $C_1$-$C_{20}$ alkyl group, a $C_1$-$C_{20}$ alkoxy group, a $C_6$-$C_{30}$ aryl group, or a $C_6$-$C_{30}$ aryloxy group.

A liquid crystal display according to an exemplary embodiment of the present invention includes a color filter. The liquid crystal display may be a twisted nematic (TN) mode, a vertical alignment (VA) mode, an in-plane switching (IPS) mode, and the like, and is not particularly limited thereto. The color filter may be formed on an upper panel, and may be formed on a lower panel including a thin film transistor.

The color filter includes both a pigment and a dye. The color filter including both the pigment and the dye may have transmittance that is higher than the color filter including only the pigment without the dye by approximately 5% or more.

The dye includes a compound represented by the following Formula 1. In addition, the dye may be provided by mixing the compound represented by the following Formula 1 and a general dye with each other to form a mixture.

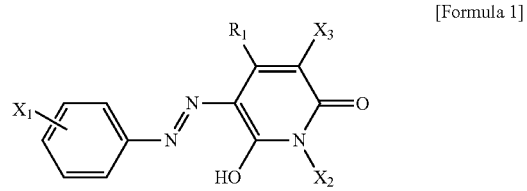

[Formula 1]

wherein R1 is hydrogen or a substituted or unsubstituted $C_1$-$C_5$ alkyl group, $X_1$, $X_2$, and $X_3$ are independently a $NR_2R_3$ group, $OR_4$, a $R_5C=CR_6R_7$ group, or a $OC(=O)$ $R_8C=CR_9R_{10}$ group, and $R_2$ to $R_{10}$ are independently hydrogen or a substituted or unsubstituted $C_1$-$C_5$ alkyl group.

Since the compound represented by Formula 1 includes a reaction group capable of forming a network structure, heat resistance, light resistance and chemical resistance of the color filter may be improved. In addition, in terms of reliability such as heat resistance, light resistance and chemical resistance, the color filter including the compound represented by Formula 1 may be similar to a color filter including only a pigment without a dye.

However, since it is difficult to form a network structure in a general dye, the heat resistance, the light resistance and the chemical resistance of the color filter are lower than those of the color filter including the compound represented by Formula 1, such that the reliability thereof may be low.

A kind of the pigment is not particularly limited, but at least one of the following pigments may be used in the mixture. Examples of pigments include such pigments as an anthraquinone pigment, a compensated polycyclic pigment such as perylenes, a phthalocyanine pigment, and an azo-based pigment.

The composition for a color filter includes a dye and a pigment. In addition, the composition for the color filter may include one or more of a binder polymer, a monomer, an initiator, a solvent, a leveling agent, a coupling agent, and the like.

A kind of the binder polymer is not particularly limited, but one or more binders may be used in the mixture. In addition, the binder polymer may be a copolymer. For example, the binder may be an acrylic polymer and a meth acrylic polymer. The weight average molecular weight of the binder polymer may be approximately 10,000 to 100,000.

A kind of the monomer is not particularly limited, and one or more monomers may be used in the mixture. For example, the monomer may be an acrylic monomer.

A kind of the initiator is not particularly limited, but at least one or more initiators may be used in the mixture. For example, as the initiator, there may be an acetophenone-based compound, a benzophenone-based compound, an oxime-based compound, and the like.

A kind of the solvent is not particularly limited, but one or more solvents may be used in the mixture. For example, as the solvent, there may be propylene glycol monomethyl ether acetate (PGMEA), ethyl-3-ethoxy propionate (EEP), ethylenediglycolmethylethylether (EDM), methyl-3-methoxy propionate (MMP), gamma-butyrolactone, N-methyl-2-pyrrolidone, and the like.

A kind of the leveling agent is not particularly limited, but one or more leveling agents may be used in the mixture. For example, as the leveling agent, there may be a perfluorinated compound.

A kind of the coupling agent is not particularly limited, but one or more coupling agents may be used in the mixture. For example, as the coupling agent, there may be a silane-based compound.

FIG. 1 is a view schematically illustrating a reaction of a dye according to an exemplary embodiment of the present invention. With reference to FIG. 1, there is a binder polymer, a monomer, a dye and an initiator. The dye is a compound represented by Formula 1. In the exposure process of the color filter, a color filter having a network structure is formed by reacting the compound represented by Formula 1 with the monomer or the binder polymer. At least one of: bonding of the dye and the binder polymer; bonding of the dye and the monomer; bonding of the binder polymer and the binder polymer; bonding of the monomer and the binder polymer; and bonding of the monomer and the monomer may be formed. The heat resistance, the light resistance, and chemical resistance of the color filter may be improved by the formation of the bonding.

Figure 2:
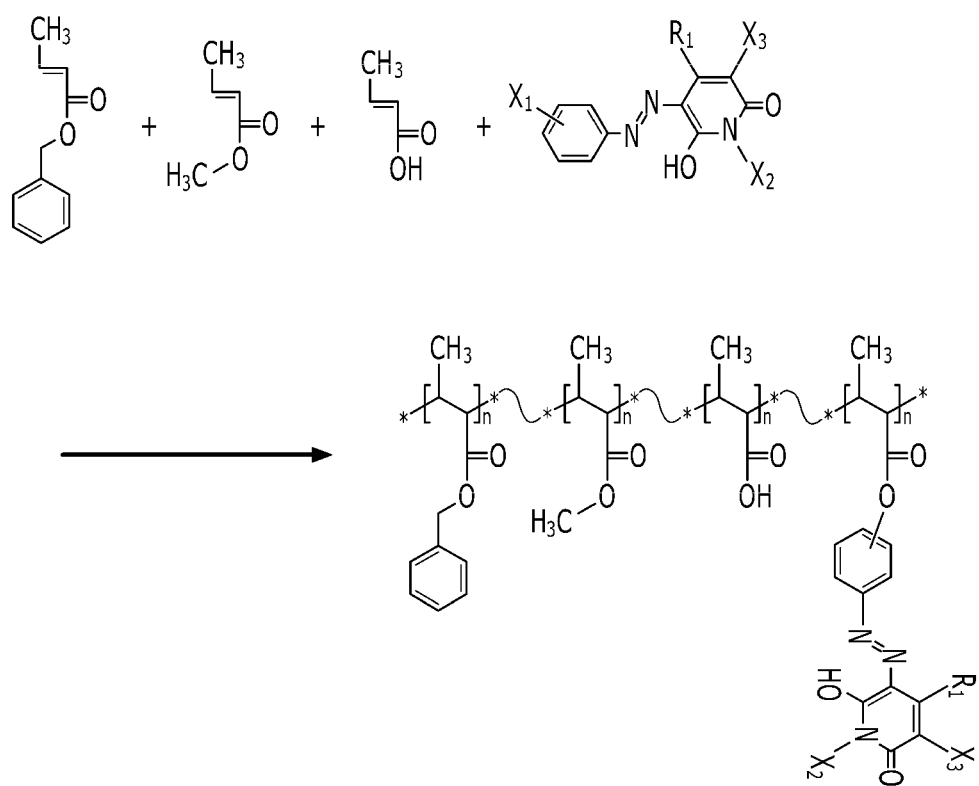
FIG. 2 is a view schematically illustrating a reaction of a dye according to the exemplary embodiment of the present invention.

FIG. 2 is a view schematically illustrating a reaction of a dye according to the exemplary embodiment of the present invention. With reference to FIG. 2, the compound represented by Formula 1 may be formed as a side chain of the binder polymer by polymerizing three monomers and the dye represented by Formula 1, and the binder polymer having the side chain may be selectively included in the composition for the color filter. In other words, before the photosensitive photoresist is manufactured, the dye may be reacted with the monomer or the binder polymer. In this case, since mobility of the dye is reduced, the heat resistance, the light resistance, and the chemical resistance of the color filter may be improved. In FIG. 2, as the polymerization catalyst, azobisisobutyronitrile (AIBN), benzoyl peroxide (BPO), and the like may be used, and the reaction temperature may be about 60° C. to about 100° C.

Now, a liquid crystal display according to an exemplary embodiment of the present invention will be described in detail with reference to FIG. 3 and FIG. 4.

Figure 3:
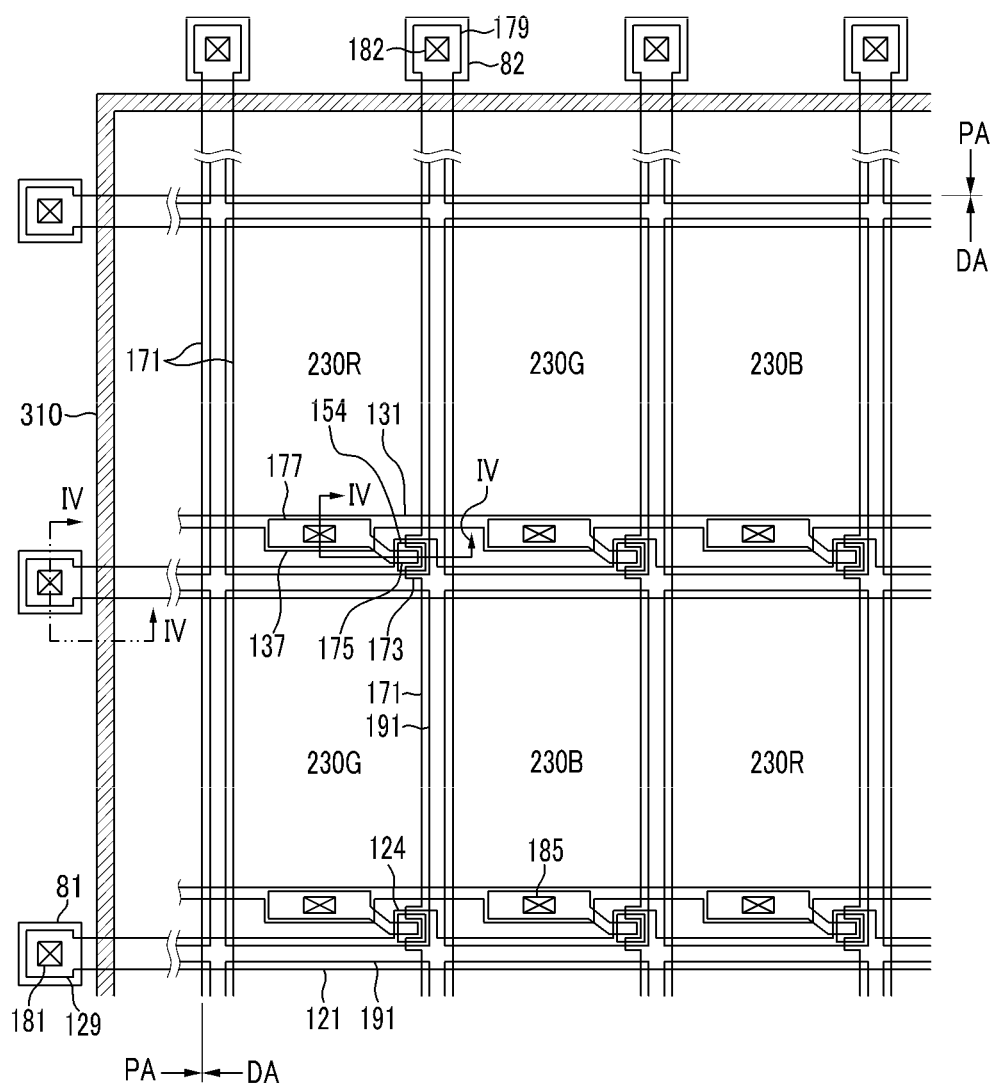
FIG. 3 is a layout view of a liquid crystal display according to an exemplary embodiment of the present invention.
Figure 4:
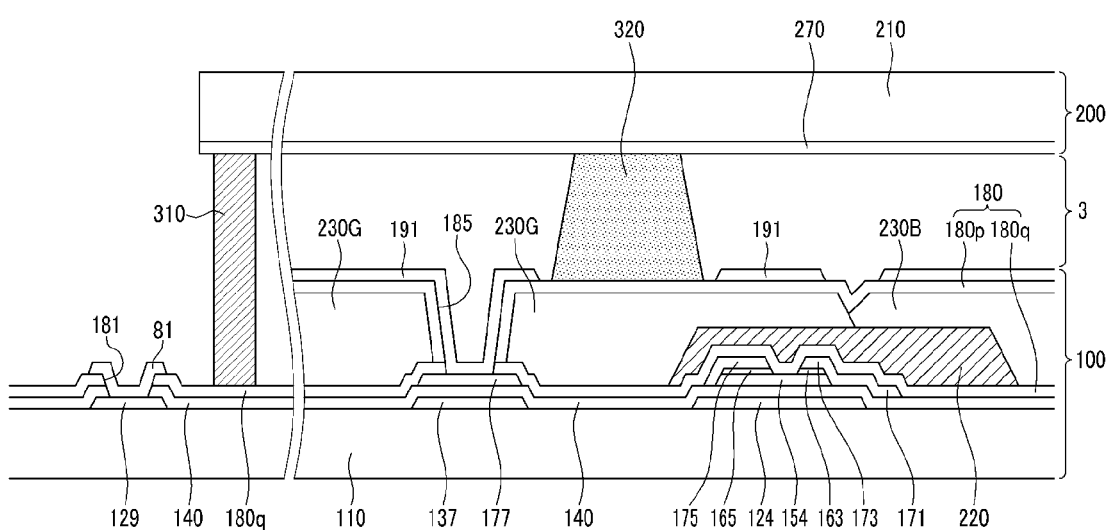
FIG. 4 is a cross-sectional view taken along line IV-IV of the liquid crystal display of FIG. 3.

FIG. 3 is a layout view of a liquid crystal display according to an exemplary embodiment of the present invention, and FIG. 4 is a cross-sectional view of a liquid crystal display that is taken along line IV-IV of FIG. 3.

With reference to FIG. 3 and FIG. 4, the liquid crystal display according to the exemplary embodiment of the present invention includes a first display panel 100, a second display panel 200, and a liquid crystal layer 3.

An alignment layer (not shown) may be formed on inner sides of the first display panel 100 and the second display panel 200, and may be a horizontal alignment layer. A polarizer (not shown) may be provided on outer sides of the first display panel 100 and the second display panel 200.

A display area (DA) of the liquid crystal display is a region outputting a real image, and a peripheral area (PA) thereof is a region surrounding the display area (DA) in which various wires are formed.

First, the first display panel 100 will be described.

An insulating first substrate 110 may include transparent glass or transparent plastic. A gate line 121 and a storage electrode line 131 are disposed on the insulating first substrate 110.

The gate line 121 transfers a gate signal, and the gate line 121 mainly extends in a horizontal direction. Each gate line 121 includes a plurality of gate electrodes 124 that protrude upward.

The storage electrode line 131 extends almost parallel to the gate line 121 while a predetermined voltage is applied thereto. The storage electrode line 131 is adjacent to the gate line 121 therebelow. The shape and the disposition of the storage electrode line 131 may be changed into various forms. The storage electrode line 131 may be omitted.

A gate insulating layer 140 is formed on the gate line 121 and the storage electrode line 131. The gate insulating layer 140 may include silicon nitride (SiNx), silicon oxide (SiO$_2$), or the like.

The gate insulating layer 140 and the semiconductor island 154 are disposed. The semiconductor island 154 may include hydrogenated amorphous silicon (amorphous silicon is abbreviated to a-Si), polysilicon, or the like. The semiconductor island 154 is disposed corresponding to a gate electrode 124. Besides, the plane shape of is the semiconductor may be substantially the same as the plane shape of the data line 171.

Ohmic contacts 163 and 165 are disposed on the semiconductor island 154. The ohmic contacts 163 and 165 may be made of n+ hydrogenated amorphous silicon to which an n-type impurity such as phosphorus is doped in a high concentration, or may be silicide. Besides, the plane shape of the ohmic contact may be substantially the same as the plane shape of the data line 171.

The data line 171 and a drain electrode 175 are disposed on the ohmic contacts 163 and 165 and the gate insulating layer 140.

The data line 171 transfers a data voltage and mainly extends in a vertical direction and crosses the gate line 121. The data line 171 may be adjacent to the gate electrode 124. The data line 171 includes a source electrode 173 that has a bend shape in a form of a U character lying on the side on the gate electrode 124. However, the source electrode 173 may have various shapes in addition to the form of a U character.

The drain electrode 175 is spaced apart from the data line 171, and includes a narrow portion and a wide portion 177. The narrow portion includes an end portion partially surrounded by the source electrode 173, and the wide portion 177 is approximately square or rectangular and overlaps a main storage electrode 137. The wide portion 177 of the drain electrode 175 may be generally smaller than an area of the main storage electrode 137.

The gate electrode 124, the source electrode 173, and the drain electrode 175 form a thin film transistor (TFT) in conjunction with the semiconductor island 154, and a channel of the thin film transistor is formed in the semiconductor 154 between the source electrode 173 and drain electrode 175.

The ohmic contacts 163 and 165 exist only between the semiconductor 154 therebelow and the data line 171 and the drain electrode 175 thereon, and reduce contact resistance thereof. In the semiconductor island 154, there is an exposed portion that is not covered between the source electrode 173 and the drain electrode 175 and the data line 171 and the drain electrode 175.

On the data line 171, the drain electrode 175, and the exposed portion of the semiconductor island 154, a passivation layer 180 is disposed. The passivation layer 180 may include an upper film 180p and a lower film 180q that are made of an inorganic insulator such as silicon nitride or silicon oxide. In addition, the upper film 180p may be made of an organic insulator, and in this case, the upper film 180p may be thicker than the lower film 180q. Any one of the upper film 180p and the lower film 180q may be omitted. A contact hole 185 that exposes a portion of the wide portion 177 of the drain electrode 175 is formed in the passivation layer 180.

A light blocking member (black matrix) 220 is disposed on the lower film 180q. The light blocking member 220 prevents light from passing through a region in which liquid crystal molecules of the liquid crystal layer 3 cannot be controlled or external light from being reflected. However, the light blocking member 220 may be disposed on not the first display panel 100 but the second display panel 200.

A red color filter 230R, a green color filter 230G and a blue color filter 230B are formed between the upper film 180p and the lower film 180q. The red color filter 230R occupies a region between the adjacent data lines 171. The left and the right boundaries of the red color filter 230R are disposed on the data line 171 and may vertically extend along the data line 171, and in this case, the red color filter 230R may have a band shape. A contact hole 185 that is disposed on the wide portion 177 of the drain electrode 175 is formed in the red color filter 230R. The red color filter 230R may be made of a photosensitive organic material including a red pigment and a red dye. However, the red color filter 230R may be disposed on not the first display panel 100 but the second display panel 200, and in this case, the upper film 180p may be omitted. The above description of the red color filter 230R may be similarly applied to the green color filter 230G and the blue color filter 230B.

A pixel electrode 191 is disposed on the upper film 180p. The pixel electrode 191 may include a transparent conductive material such as indium tin oxide (ITO) or indium zinc oxide (IZO). In the case where the color filters 230R, 230G, and 230B are formed on the second display panel 200, the pixel electrode 191 may include the transparent conductive material or a reflective metal such as aluminum, silver, chromium or an alloy thereof.

The pixel electrode 191 may include a cutout (not shown), and may have various forms and shapes.

The pixel electrode 191 is connected to the drain electrode 175 through the contact hole 185, and applied with a data voltage from the drain electrode 175. The pixel electrode 191 to which the data voltage is applied generates an electric field in conjunction with the common electrode 270 of the second display panel 200 to determine a direction of the liquid crystal molecules of the liquid crystal layer 3 between the pixel electrode 191 and the common electrode 270. As described above, according to the determined direction of the liquid crystal molecules, the luminance of light that passes through the liquid crystal layer 3 is changed.

The pixel electrode 191 and the common electrode 270 form a liquid crystal capacitor to maintain the applied voltage even after the thin film transistor is turned off.

The pixel electrode 191 and the drain electrode 175 connected thereto overlap the storage electrode line 131 including the main storage electrode 137 and a secondary storage electrode (not shown) to form a storage capacitor.

A spacer 320 is made of an organic material, and is disposed in a display area DA of the liquid crystal display. In addition, the spacer maintains an interval of the liquid crystal layer 3.

Next, the second display panel 200 will be described.

The insulating second substrate 210 may include transparent glass or transparent plastic. The common electrode 270 is disposed on the insulating second substrate 210. The common electrode 270 may include the transparent conductor such as ITO and IZO, and is applied with a common voltage. The common electrode may include a cutout (not shown), and may have various forms and shapes. In addition, the common electrode 270 may be disposed on the first display panel 100.

An alignment layer may be formed on the common electrode 270.

A sealant 310 is disposed in a peripheral area PA of the liquid crystal display and is disposed between the first display panel 100 and the second display panel 200, and seals liquid crystal. In this case, the sealant 310 may include a liquid crystal injection hole (not shown), and may be disposed on any one of the first display panel 100 and the second display panel 200.

The first display panel 100 and the second display panel 200 may include a domain determining member (not shown) such as the cutout, and the protrusion portion.

The liquid crystal layer 3 has a positive dielectric anisotropy, and the liquid crystal molecule of the liquid crystal layer 3 may be a TN mode liquid crystal that is aligned so that long axes thereof are almost horizontal in respects to the surface of two display panels 100 and 200 in a state in which there is no electric field. Besides, the liquid crystal layer 3 may include a VA mode liquid crystal, an electrically controlled birefringence (ECB) mode liquid crystal, an IPS mode liquid crystal, and the like.

A method for manufacturing the liquid crystal display according to the exemplary embodiment of the present invention will be described.

First, the gate line 121 and the storage electrode line 131 that are signal lines of the display area DA are formed on the first substrate, and a gate line layer signal line (not shown) of the gate driver that is a signal line of the peripheral area PA is formed thereon. In addition, the gate insulating layer 140 is formed.

The data line 171 that is a signal line of the display area DA is formed on the gate insulating layer 140, and the storage voltage supply line (not shown) that is the signal line of the peripheral area PA and the data line layer signal line (not shown) of the data driver are for formed. In addition, the lower film 180q is formed. Moreover, before the lower film 180q is formed, the thin film transistor connected to the signal line of the to display area DA may be formed. In this case, the lower film 180q is formed on the thin film transistor.

The light blocking member 220 is formed on the lower film 180q, and the upper film 180p is formed on the light blocking member 220. In addition, the pixel electrode 191 is formed on the upper film 180p.

Color filters 230R, 230G, and 230B may be formed on the lower film 180q. When the color filters 230R, 230G, and 230B are formed, an exposure process is performed, and the compound represented by Formula 1 may be bonded to a binder polymer, a monomer, and the like by the exposure process. In this case, the upper film 180q is formed on the color filters 230R, 230G, and 230B, and the pixel electrode 192 is formed on the upper film 180p.

A spacer 320 is formed on the pixel electrode 191.

The liquid crystal layer 3 is formed on the spacer 320.

In addition, a common electrode 270 is formed on the second substrate 210.

Next, the second substrate 210 is disposed so that the common electrode 270 formed on the second substrate 210 is contacted with the liquid crystal layer 3, and the first substrate 110 and the second substrate 210 are bonded to each other.

However, in the case where the liquid crystal layer 3 is formed on the common electrode 270 of the second substrate 210, the second substrate 210 is disposed so that a spacer, an auxiliary spacer, and a light blocking auxiliary member formed on the first substrate 210 are contacted with the liquid crystal layer 3, and the first substrate 110 and the second substrate 210 are bonded to each other.

The method for forming the thin film transistor and the electrode may be methods such as thin film deposition and patterning by photolithography that are a general method for forming the thin film.

Although exemplary embodiments of the color filter have been described with respect to liquid crystal displays, the color filter according to exemplary embodiments of the present invention is not limited thereto, but may be used in any device that has a color filter.

Hereinafter, the present invention will be described in more detail with reference to Examples, and the following Examples are Examples of exemplary embodiments of the present invention but the present invention is not limited by the following Examples.

Example 1

The color filter was manufactured by using 3.6 parts by weight of C. I pigment green 58 and 1.2 parts by weight of C. I pigment yellow 150 as the pigment, 1.2 parts by weight of the compound ($R_1$:$CH_3$, $X_1$:OH, $X_2$:$OCH_3$, $X_3$:OC(=O)CH=$CH_2$) represented by the above Formula 1 as the dye, 2 parts by weight of benzyl meth acrylate/meth acrylic acid copolymer (70/30), 2 parts by weight of the binder polymer ($R_1$:$CH_3$, $X_1$:OH, $X_2$:$OCH_3$, $X_3$:OC(=O)CH=$CH_2$) having the side chain shown in FIG. 2 as the binder polymer, 3 parts by weight of dipentaerythrithol hexacrylate as the monomer, 3 parts by weight of I369 (Irgacure 369) as the initiator, 76 parts by weight of PGMEA as the solvent, 1 part by weight of the fluorine-based compound as the leveling agent, and 1 part by weight of the silane-based compound as the coupling agent.

Comparative Example 1

The color filter was manufactured by using 3.6 parts by weight of C. I pigment green 58 and 1.2 parts by weight of C. I pigment yellow 150 as the pigment, 1.2 parts by weight of the compound represented by the following Formula 2 as the dye, 4 parts by weight of benzyl meth acrylate/meth acrylic acid copolymer (70/30) as the binder polymer, 3 parts by weight of dipentaerythrithol hexacrylate as the monomer, 3 parts by weight of I369 (Irgacure 369) as the initiator, 76 parts by weight of PGMEA as the solvent, 1 part by weight of the fluorine-based compound as the leveling agent, and 1 part by weight of the silane-based compound as the coupling agent.

[Formula 2]

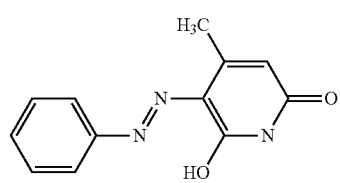

Comparative Example 2

The color filter was manufactured by using 3.6 parts by weight of C. I pigment green 58 and 2.4 parts by weight of C. I pigment yellow 150 as the pigment, 4 parts by weight of benzyl meth acrylate/meth acrylic acid copolymer (70/30) as the binder polymer, 3 parts by weight of dipentaerythrithol hexacrylate as the monomer, 3 parts by weight of I369 (Irgacure 369) as the initiator, 76 parts by weight of PGMEA as the solvent, 1 part by weight of the fluorine-based compound as the leveling agent, and 1 part by weight of the silane-based compound as the coupling agent.

Measurement of Heat Resistance

The heat resistance with respect to the color filters manufactured in Example 1, and Comparative Examples 1 and 2 was measured, and the measurement results are described in the following Table 1. The heat resistance was measured by heat treatment in the oven at 230° C. for 1 hour and checking the color difference ΔEab* before and after the heat treatment. The heat resistance is better as the color difference is decreased. As shown in the following Table 1, it may be seen that the heat resistance of Example 1 is better than the heat resistance of Comparative Example 1, and the heat resistance of Example 1 is similar to the heat resistance of Comparative Example 2.

TABLE 1

|  | ΔEab* |
| --- | --- |
| Example 1 | 1.23 |
| Comparative Example 1 | 4.36 |
| Comparative Example 2 | 0.78 |

Measurement of Light Resistance

The light resistance with respect to the color filters manufactured in Example 1, and Comparative Examples 1 and 2 was measured, and the measurement results are described in the following Table 2. The light resistance was measured by irradiating the C light source for 168 hours and checking the color difference ΔEab* before and after the irradiation. The light resistance is better as the color difference decreases. As shown in the following Table 2, it can be seen that the light resistance of Example 1 is better than the light resistance of Comparative Example 1, and the light resistance of Example 1 is similar to the light resistance of Comparative Example 2.

TABLE 2

|  | ΔEab* |
| --- | --- |
| Example 1 | 1.2 |
| Comparative Example 1 | 4.9 |
| Comparative Example 2 | 0.79 |

Measurement of Chemical Resistance

The chemical resistance with respect to the color filters manufactured in Example 1, and Comparative Examples 1 and 2 was measured, and the measurement results are described in the following Table 3. The chemical resistance was measured by the color difference ΔEab* before and after the color filter was treated by the solvent. The chemical resistance is better as the color difference decreases. As shown in the following Table 3, it can be seen that the chemical resistance of Example 1 is better than the chemical resistance of Comparative Example 1, and the chemical resistance of Example 1 is similar to the chemical resistance of Comparative Example 2.

TABLE 3

|  | ΔEab* | |
| --- | --- | --- |
|  | EDM/MMP = 8/2 80° C., 10 min | PGMEA/EEP = 8/2 90° C., 5 min |
| Example 1 | 1.10 | 0.32 |
| Comparative Example 1 | 36.94 | 34.29 |
| Comparative Example 2 | 0.38 | 0.37 |

Voltage Holding Rate (VHR)

The voltage holding rate with respect to the color filters manufactured in Example 1, and Comparative Examples 1 and 2 was measured, and the measurement results are described in the following Table 4. As shown in the following Table 4, it can be seen that the voltage holding rate of Example 1 is better than the voltage holding rates of Comparative Example 1 and Comparative Example 2.

TABLE 4

|  | VHR (%) | |
| --- | --- | --- |
|  | Room Temp. | 60° |
| Example 1 | 98.47 | 97.53 |
| Comparative Example 1 | 66.55 | 55.19 |
| Comparative Example 2 | 94.97 | 90.74 |

According to exemplary embodiments of the present invention, it is possible to improve reliability of a color filter while improving transmittance of the color filter, improve chemical resistance of the color filter, improve heat resistance of the color filter, and improve light resistance of the color filter.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a second substrate facing the first substrate;
a liquid crystal layer disposed between the first substrate and the second substrate;
a first electrode disposed on at least one of the first substrate and the second substrate;
a second electrode disposed on at least one of the first substrate and the second substrate; and
a color filter disposed between the first substrate and the second substrate, the color filter comprising a dye and a pigment,
wherein the color filter comprises a compound represented by the following Formula 1:

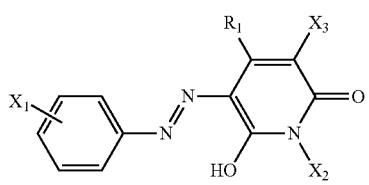

[Formula 1]

wherein:
R1 is hydrogen or a substituted or unsubstituted $C_1$-$C_5$ alkyl group,
$X_1$, $X_2$, and $X_3$ are independently a $NR_2R_3$ group, $OR_4$, a $R_5C=CR_6R_7$ group, or a $OC(=O)R_8C=CR_9R_{10}$ group, and
$R_2$ to $R_{10}$ are independently hydrogen or a substituted or unsubstituted $C_1$-$C_5$ alkyl group, and wherein the color filter further comprises a binder polymer bonded to the compound represented by the above Formula 1.

2. The liquid crystal display of claim 1, wherein:
the color filter further comprises a monomer bonded to the compound represented by the above Formula 1.

3. The liquid crystal display of claim 2, wherein:
the binder polymer and the monomer are bonded to each other.

4. The liquid crystal display of claim 2, wherein:
the color filter further comprises a plurality of monomers bonded to each other.

5. The liquid crystal display of claim 1, wherein:
the color filter further comprises a plurality of binder polymers bonded to each other.

6. The liquid crystal display of claim 1, wherein:
the liquid crystal layer comprises a twisted nematic (TN) mode liquid crystal, a vertical alignment (VA) mode liquid crystal, an electrically controlled birefringence (ECB) mode liquid crystal, or an in-plane switching (IPS) mode liquid crystal.

7. A method for manufacturing a liquid crystal display, the method comprising:
forming a pair of electrodes on at least one of the first substrate and the second substrate;
forming a color filter comprising a dye and a pigment on at least one of the first substrate and the second substrate; and
disposing a liquid crystal layer between the first substrate and the second substrate,
wherein the color filter is formed from a compound represented by the following Formula 1:

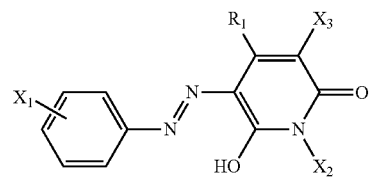

[Formula 1]

wherein R1 is hydrogen or a substituted or unsubstituted $C_1$-$C_5$ alkyl group, $X_1$, $X_2$, and $X_3$ are independently a $NR_2R_3$ group, $OR_4$, a $R_5C=CR_6R_7$ group, or a $OC(=O)R_8C=CR_9R_{10}$ group, and $R_2$ to $R_{10}$ are independently hydrogen or a substituted or unsubstituted $C_1$-$C_5$ alkyl group, and wherein forming the color filter comprises: bonding the compound represented by the above Formula 1 and a binder polymer to each other by conducting an exposure process.

8. The method of claim 7, wherein conducting the exposure process further comprises:
bonding the compound represented by the above Formula 1 and a monomer to each other.

9. The method of claim 8, wherein:
the binder polymer and the monomer are bonded to each other by the exposure process.

10. The method of claim 7, further comprising:
reacting the compound represented by Formula 1 and a binder polymer with each other.

11. The method of claim 7, wherein:
a plurality of monomers are bonded to each other by the exposure process.

12. The method of claim 7, wherein:
a plurality of binder polymers are bonded to each other by the exposure process.

13. The method of claim 7, wherein the liquid crystal layer comprises:
a twisted nematic (TN) mode liquid crystal, a vertical alignment (VA) mode liquid crystal, an electrically controlled birefringence (ECB) mode liquid crystal, or an in-plane switching (IPS) mode liquid crystal.

14. A color filter, comprising:
a dye and a pigment,
wherein the dye comprises a compound represented by the following Formula 1:

[Formula 1]

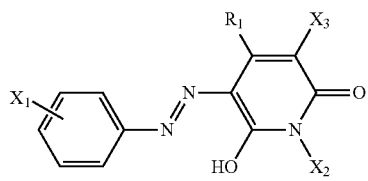

wherein:
R1 is hydrogen or a substituted or unsubstituted $C_1$-$C_5$ alkyl group,
$X_1$, $X_2$, and $X_3$ are independently a $NR_2R_3$ group, $OR_4$, a $R_5C{=}CR_6R_7$ group, or a $OC({=}O)R_8C{=}CR_9R_{10}$ group, and
$R_2$ to $R_{10}$ are independently hydrogen or a substituted or unsubstituted $C_1$-$C_5$ alkyl group, and wherein the color filter further comprises a binder polymer bonded to the compound represented by the above Formula 1.

15. The color filter of claim 14, further comprising a monomer bonded to the compound represented by the above Formula 1.

16. The color filter of claim 15, wherein the binder polymer and the monomer are bonded to each other.

17. The color filter of claim 15, further comprising a plurality of monomers bonded to each other.

18. The color filter of claim 17, further comprising a plurality of binder polymers bonded to each other.

* * * * *